US005457636A

United States Patent [19]

Sansone et al.

[11] Patent Number: 5,457,636

[45] Date of Patent: Oct. 10, 1995

[54] POSTAL FINISHING KIOSK

[75] Inventors: Ronald P. Sansone, Weston; Michael D. O'Hare, Fairfield, both of Conn.; Steven M. Kaye, Bronx, N.Y.; John C. Hamma, Milford, Conn.; John T. Balga, Jr., Stratford, Conn.; Fran E. Blackman, Fairfield, Conn.; David W. Hubbard, Stamford, Conn.; Kevin D. Hunter, Stratford, Conn.; Wendy F. Jai, San Diego, Calif.; Scott Korowotny, Oxford, Conn.; Jeffrey D. Pierce, Norwalk, Conn.

[73] Assignee: Pitney Bowes Inc., Stamford, Conn.

[21] Appl. No.: 99,286

[22] Filed: Jul. 29, 1993

[51] Int. Cl.[6] .................... G06F 17/60

[52] U.S. Cl. .................... 364/478; 364/479

[58] Field of Search .................... 364/401, 478, 364/479, 468, 464.02, 464.03; 235/381; 242/55; 493/10

[56] References Cited

U.S. PATENT DOCUMENTS

| | | | |
|---|---|---|---|
| 3,552,668 | 1/1971 | Kanno | 242/55 |
| 4,607,433 | 8/1986 | Meeker | 33/1 BB |
| 4,800,506 | 1/1989 | Axelrod et al. | 364/478 |
| 4,800,509 | 1/1989 | Axelrod et al. | 364/478 |
| 4,900,905 | 2/1990 | Pusic . | |
| 4,940,887 | 7/1990 | Sheng-Jung . | |
| 4,943,270 | 7/1990 | Fleckenstein | 493/10 |
| 5,036,472 | 7/1991 | Bookley et al. | 364/479 |
| 5,056,029 | 10/1991 | Cannon | 364/468 |
| 5,065,000 | 11/1991 | Dusil | 235/381 |
| 5,132,915 | 7/1992 | Goodman | 364/479 |
| 5,142,482 | 8/1992 | Sansone | 364/478 |
| 5,146,403 | 9/1992 | Goodman | 364/401 |

*Primary Examiner*—James P. Trammell
*Attorney, Agent, or Firm*—Ronald Reichman; Melvin J. Scolnick

[57] ABSTRACT

A postal finishing kiosk in which a user is provided with a mail piece, such as a postcard. The user supplies the name and address to which the mail piece is to be sent and the kiosk dispenses a finished mail piece to the user with the address printer thereon. A feature of the kiosk is that it stores the mail piece forms on a roll, but delivers a linear mail piece to the user. In an alternative to the invention, the kiosk dispenses a ticket to the user that can be used in activities of the environment in which the kiosk is found.

11 Claims, 6 Drawing Sheets

POSTAL FINISHING KIOSK

BACKGROUND OF THE INVENTION

Postal kiosks are known devices whereby one is able to post mail in a convenient manner. Such kiosks are designed to receive an addressed mail piece, weigh the mail piece, inform the user as to the amount of postage due, and apply postage to the mail piece upon the user making correct payment. Although kiosks have been known for a long time, they have not been used extensively nor have they shown any great commercial success. An example of such kiosks is the MAIL-O-MAT mailing machine produced by Pitney Bowes, Inc. in the 40's. This kiosk is described in U.S. Pat. No. 2,290,920. Since that time, a number of kiosks have been proposed, but none has achieved widespread commercial success.

All of the postal kiosks that have been proposed in the past have the feature of accepting mail that has been prepared by the user and receiving payment from the user for delivery of the mail. Although these kiosks provided a service, they have the requirement that the user provide a finished mail piece. A finished mail piece is one that is in a condition to be posted after postage has been paid.

Clearly, it would be advantageous if a kiosk were available that would supply finished mail pieces to an individual so that, that individual could post mail without having to provide the finished mail item. In addition, it would be advantageous to have a kiosk that produced finished mail pieces in response to information received from an individual. Further, it would be advantageous to provide a kiosk that dispenses a ticket or receipt in addition to providing postal services.

SUMMARY OF THE INVENTION

A kiosk has been conceived wherein a user of the kiosk is provided with a finished mail piece, such as a postcard, upon appropriate certain information being supplied to the kiosk. The finished postcard will have the address printed thereon as well as various bar codes that are relied upon for delivering the postcard. The kiosk of the instant invention is particularly useful in a tourist environment where individuals may not have access to items such as postcards. More particularly, the kiosk would dispense a postcard that has an association with the environment in which the kiosk is located.

The kiosk has a data input device, such as a touch screen monitor, through which the user can supply the name of the party to whom the postcard is to be sent, as well as the address of the party. Upon receiving appropriate information, the kiosk prints the address on the postcard, prints mail processing information, and delivers the postcard to the user. The user can then write a message on the postcard and subsequently post the same. This posting can be accomplished by inserting the finished post card into another kiosk specifically designed to receive the finished post card.

One of the features of the instant kiosk is that the forms for the postcards are on a roll, but the kiosk has a device for uncurling the postcard forms so that the user receives a postcard without a curl. Optionally, the kiosk may issue a ticket that would have a purpose in the environment in which the kiosk is located or a receipt if there is a charge for using the kiosk.

DETAILED DESCRIPTION OF THE PREFERRED EMBODIMENT

Figure 1:
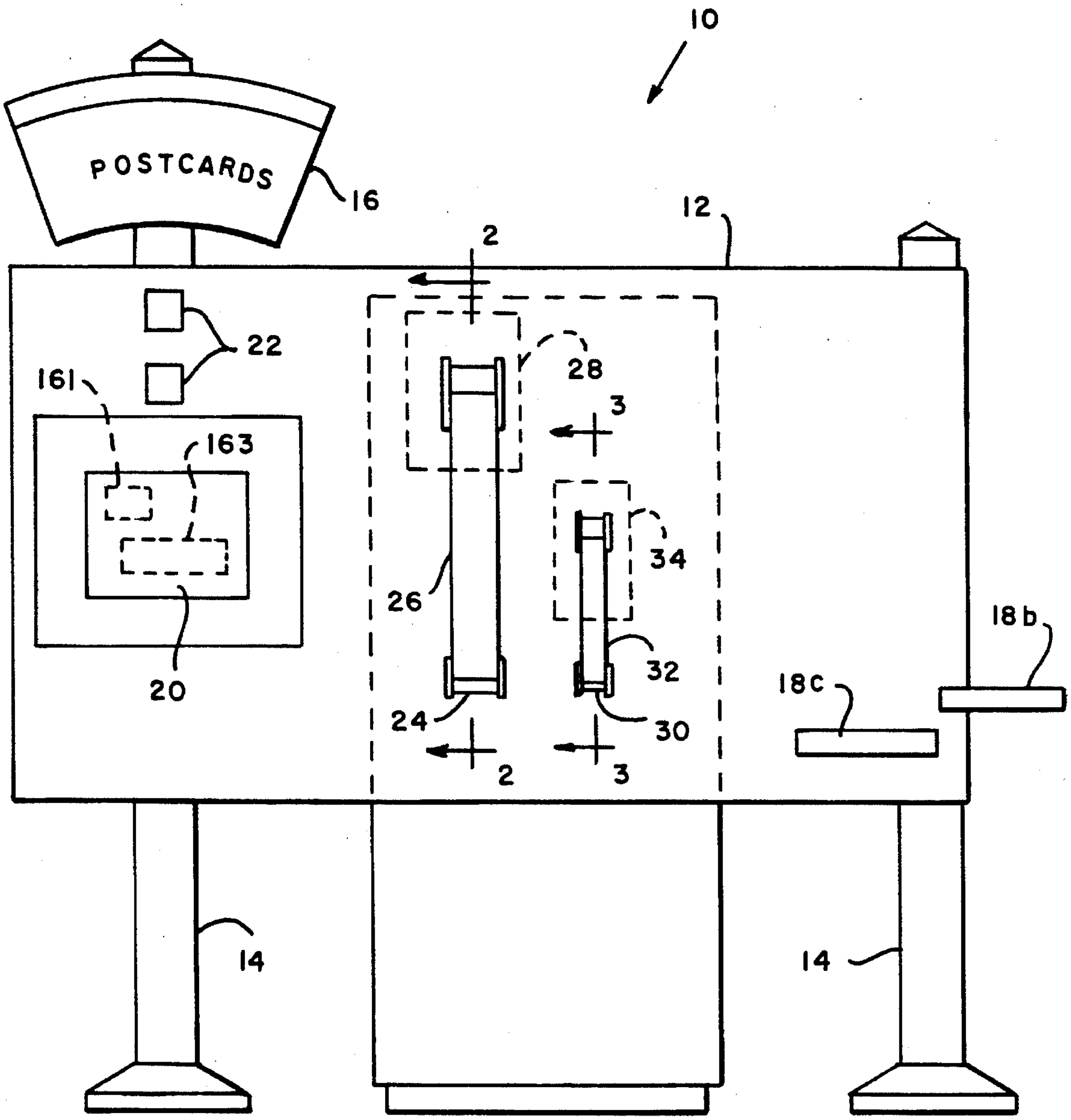
FIG. 1 is a front view of a kiosk that incorporates the features of the instant invention with interior parts shown in phantom.

With reference to FIG. 1, a postal finishing kiosk is shown generally at 10. Although the kiosk may be one that is capable of dispensing a variety of mail pieces, the kiosk of the instant invention will be described in conjunction with the dispensing of postcards. The kiosk 10 is a finishing kiosk and does not apply postage to a postcard. The kiosk is intended to be used with a postage applying kiosk such as that shown as described in concurrently filed patent application entitled "Postage Applying Kiosk". The kiosk 10 has a housing 12 that supports the components of the kiosk, the housing being supported by a plurality of legs 14. A sign 16 is located above and supported by the kiosk 10 and contains alpha numerics to indicate the function that the kiosk serves. A pair of shelves 18*a*, 18*b* are provided so as to allow the users of the kiosk 10 to write their messages on postcards dispensed by the kiosk. A touch screen monitor 20 is supported by the housing 12. Located above the touch screen monitor 20 are a pair of speakers 22 that serve the purpose of giving operating instructions to the user. The housing has an outlet slot 24 and a chute 26 made of a transparent material, such as Lucite, with the upper end of the chute 26 being located at the output end of a printer 28. Another outlet slot 30 is located at the lower end of a transparent chute 32 with the upper end of the chute being adjacent to a ticket printer 34.

Figure 2:
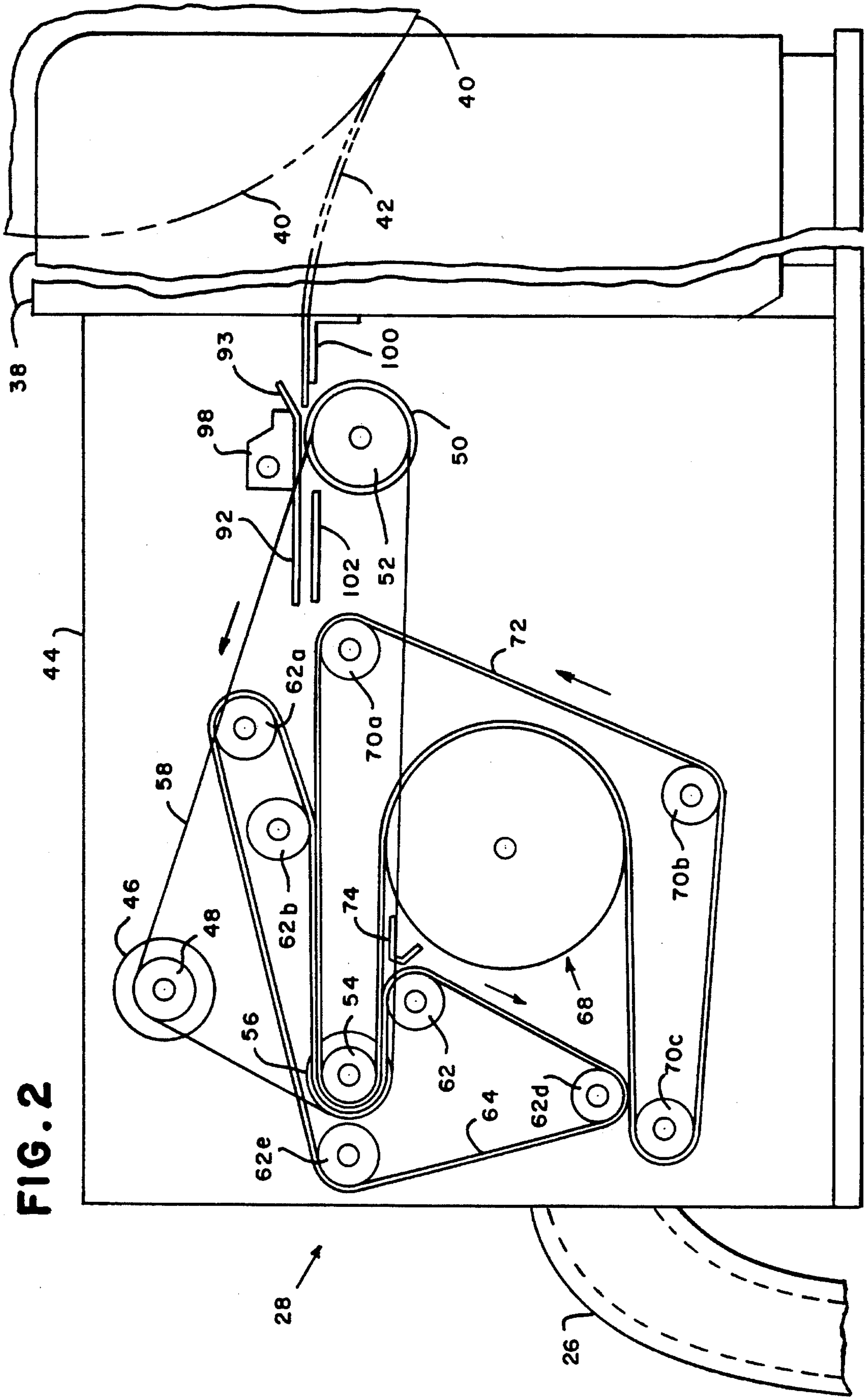
FIG. 2 is a cross sectional view taken along the lines 2—2 of FIG. 1, showing the de-curling device of the kiosk.
Figure 4:
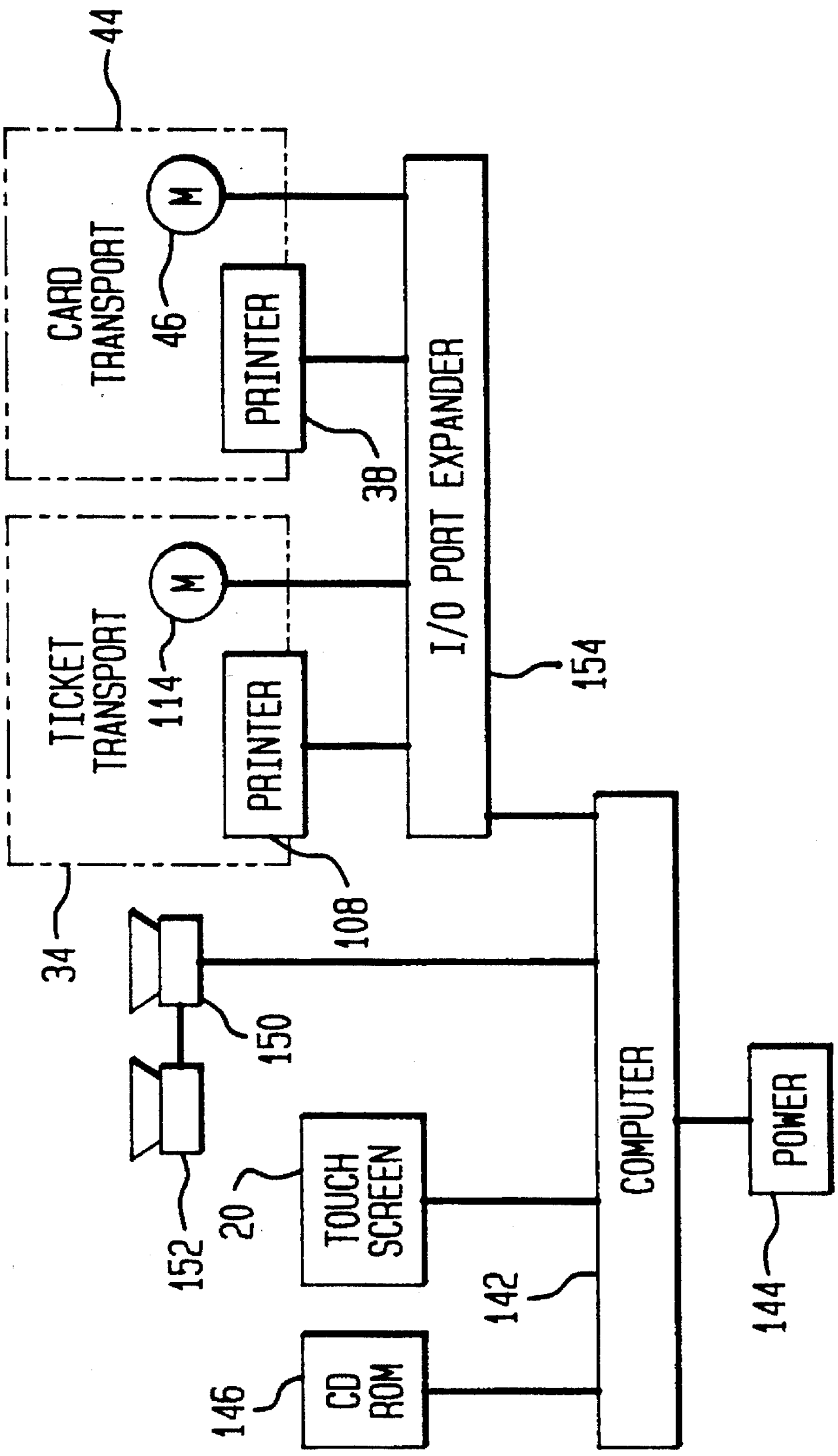
FIG. 4 is a functional diagram of the components of the kiosk shown in FIG. 1.

With reference to FIGS. 2 and 4, a cross sectional view of the postcard unit 28 is shown in FIG. 2 and includes a printer 38 having a spool 40 that supports a web of postcard forms 42. The printer 38 can be any of a number of commercially available printers such as a Monarch printer 9445-2L available from Monarch Marking Systems, which is a thermal printer. The printer 38 has the capability of printing text and bar codes on a postcard form and cutting the same from the web 42 to form a postcard 76 (see FIG. 5B). A plate 44 supports a motor 46 which has a drive pulley 48 attached to the output shaft thereof. A combination roller 50 and pulley 52 are rotatably mounted on the plate 44. Another combination of roller 54 and pulley 56 is also supported on the plate 44. A belt 58 is trained about the pulleys 48, 52, and 56 to provide drive to the rollers 50, 54. A plurality of rollers 62*a*–62*e* are also rotatably supported by the plate 44 and a belt 64 is trained about these rollers and the roller 54, drive to the belt being supplied by roller 54. A large roller 68 and a plurality of smaller rollers 70*a*–70*c* are rotatably supported by the plate 44 and support a belt 72 which is trained about these rollers and the roller 54, the belt 64 having partial engagement with the belt 72. A guide 74 is mounted on the plate 44 so as to provide support to the belt 72 to a post card discharged from between the belts 64, 72 between the rollers 62*c* and 68. Located above the roller 50 is a guide plate 92 having an angled lip 13 and which is supported by a support 98 attached to the plate 44. A deck 100 is located between the roller 50 and the outlet of the printer 38 and another deck 102 is located between the rollers 50 and belt 72.

Figure 3:
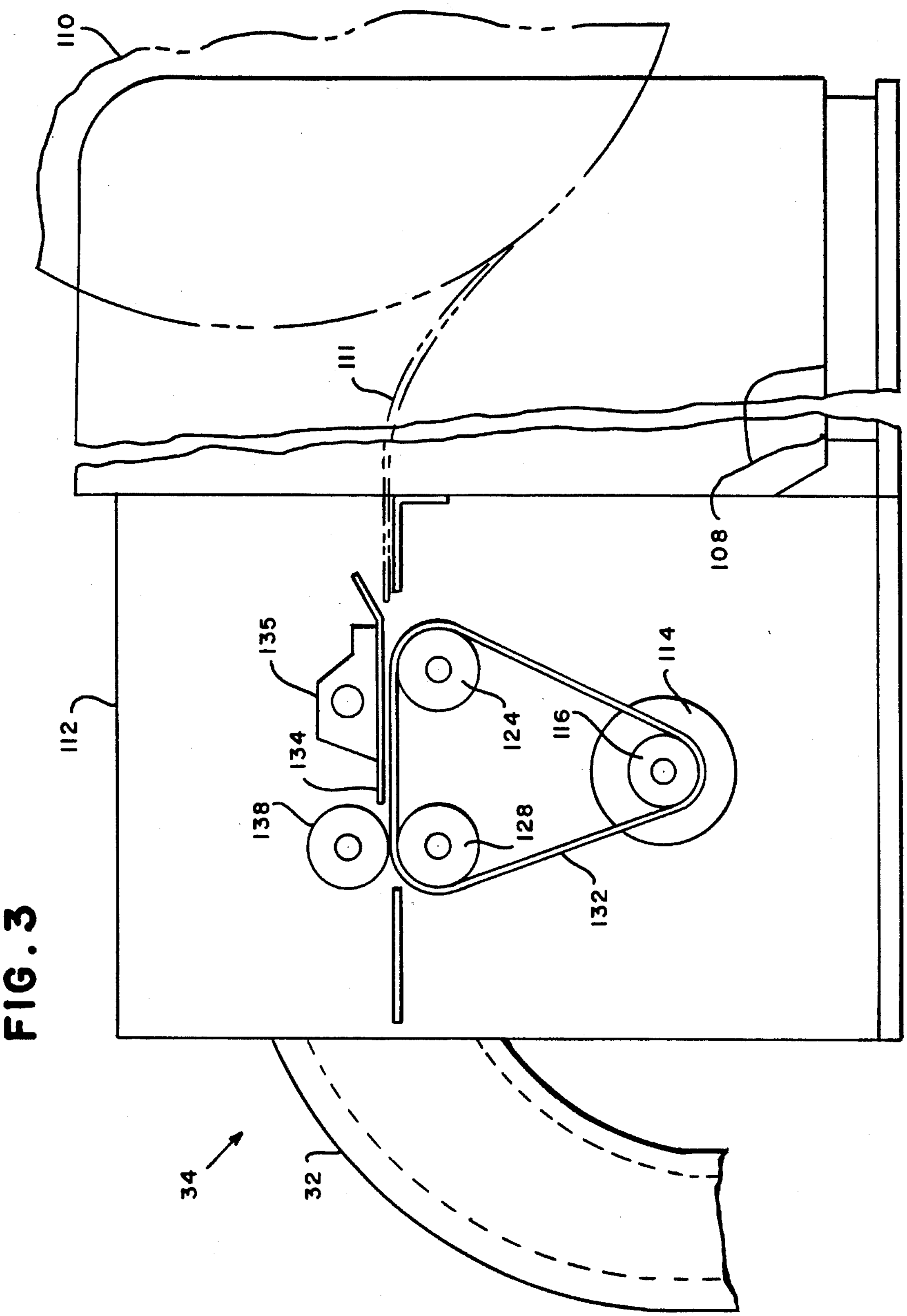
FIG 3 is a cross sectional view taken along the lines 3—3 of FIG. 1 that shows the ticket dispensing device of the kiosk.

With reference to FIG. 3, a ticket printer 108 has a reel 110, the latter supporting a web of tickets 111. The printer 108 can be a commercially available printer capable of outputting printed and cut tickets. An example of such a commercially available printer is the Monarch printer model number 9425-IY available from Monarch Marking Systems. Adjacent to the printer 108 is a ticket transport unit 34 that has a motor 114 supported by a plate 112. A pulley 116 is supported by the output shaft of the motor. The plate 112 rotatably supports two rollers 124,128. A belt 132 is trained about the pulleys 116, and rollers 124, 128 so as to provide drive to the belt 132. A guide 134 having an angled lip 135 is supported by a support member 136 attached to the plate 112 and is disposed over the rollers 124, 128 for the purpose of guiding a ticket dispensed by the printer 108. An idler roller 138 is in engagement with the belt 132 for the purpose of providing drive to a ticket. With this construction, the ticket will be guided toward the chute 32 be discharged from the ticket transport 34. A deck 140 is supported by the plate 122 adjacent to the exit of the printer 108 to guide a ticket from the printer 108 to the roller 122.

With reference to FIG. 4, the electronic circuitry components of the kiosk 10 will be described. A computer 142 is supported within the housing 12. The computer 142 can be any of a number of commercially available computers such as a Hewlett Packard Vectra 486/66ST personal computer. A program, such as ZCR ADDRESS DATA BASE, will be loaded into the computer 142. ZCR ADDRESS DATA BASE program is available from Data Resources Inc. Such a program matches the addresses and zip code and has the capability of determining whether an address input to the computer 142 is a correct address. For some addresses which are incorrectly input, the program will offer suggestions of possible correct addresses. A power source 144 is provided for the electronics of the system. A CD ROM stores the ADDRESS DATA BASE program and the computer 142 is in communication with a touch screen 34, a pair of speakers 150, 152 and an I/O port expander 154. The touch screen can be any of the commercially available touch screens such as a Mitsubishi Model HC3925A. The I/O port expander, again, can be any commercially available expander, such as a Digiboard model DTIOCTA764031. In communication with the I/O port expander 54 are the postcard printer 38 and ticket printer 108.

Figure 5A:
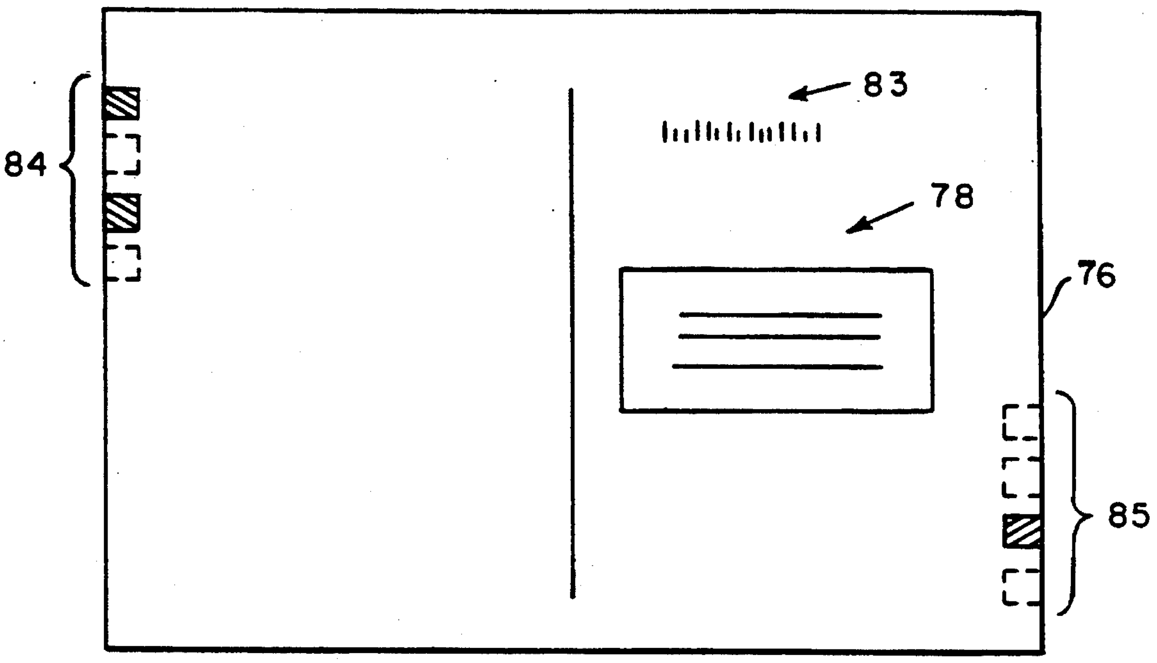
FIG. 5A is a plan view of the front of a postcard and FIG. 5 B is the back side of a postcard finished in accordance with the instant invention.
Figure 5B:
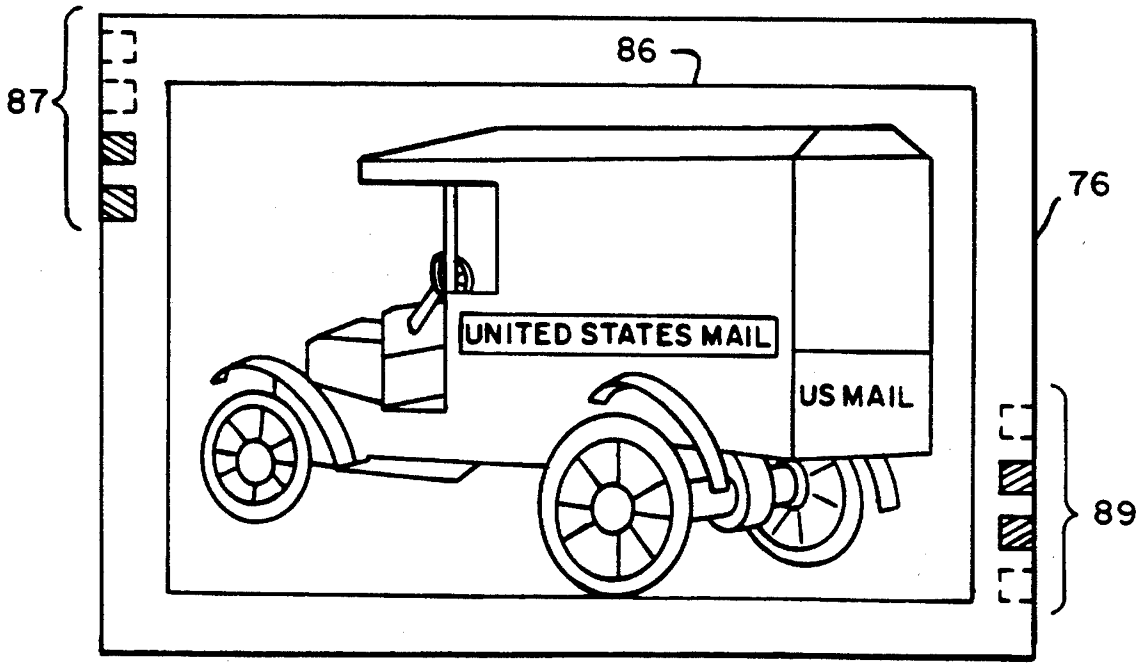

With reference now to FIGS. 5A and 5B, the front of a finished postcard 76 is shown at 5A and the back of a postcard 76 is shown at 5B. By finishing is meant placing a correctly printed address block 78 with the name, address and zip code of the recipient, a postnet bar code 83 for the benefit of assisting the post office in delivering the mail and a bar code 84 on one edge thereof. A preprinted bar code 85 is at the other edge of the postcard 76. The codes 84, 85 are a four bit code with different combinations. Bar code 84 indicates the country category to which the postcard is to be sent as will be described hereinafter. The other bar 85 is for the purpose of notifying the computer of a postage applying kiosk that the postcard has not been inserted properly into the kiosk, but that the postcard is a valid one. On the backside of the postcard 76 is a pictorial display 86, along with two other pre-printed bar codes 87, 89. The first bar code 87 is the valid code that will indicate that the postcard has been inserted in the slot of a postage applying kiosk properly, and the second bar code 93 indicates that the card has not been inserted properly but is a valid card. The same form bit bar code is used with different combinations. By valid card, is meant a card that has been finished by a postal finishing kiosk such as that of the instant invention. The bar codes 85, 87, 89 can be printed by the printer 38 or can be pre-printed.

Figure 6:
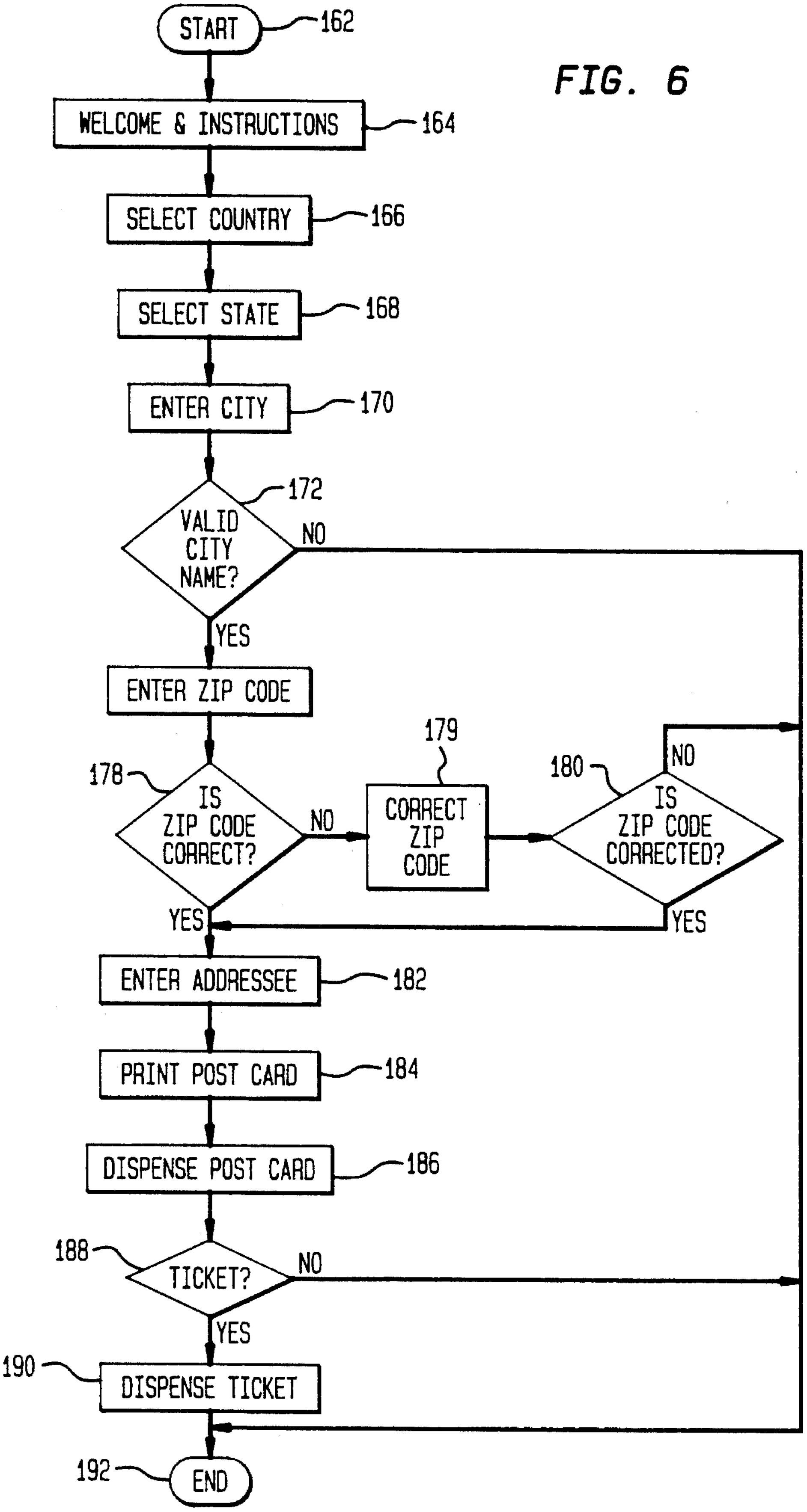
FIG. 6 is a flow chart that represents the program under which the kiosk operates.

The operation of the finishing kiosk 10 will be given in conjunction with FIGS. 1–4 as well as the flow chart of FIG. 6. The system is started 162 by an individual approaching the address kiosk and touching a start indicator on the touch screen 148. At this point, the user is welcomed and can be given instructions 164 in two ways. A visual-audio prompt will be presented with an image of the prompter appearing on the touch screen at a location 161 and the prompts will be broadcast over the speakers 150, 152. The visual-audio prompt will give to the user brief instructions as to how to use the touch screen 20 so as to assist the user in inputting information. An image 163 of a keyboard will appear on the touch screen 20 for inputting data. The user will be instructed by the visual-audio prompt to select the country 166 to which the postcard is to be sent, the country being one of three country categories. By country category is meant either the U.S., Canada and Mexico or a country other than these three. The U.S., Canada and Mexico selections will appear on the screen 20. If the post card is not to be sent to one of these three countries, the country name is inserted through the keyboard 163. After the country is selected, the state is then selected 168 from a list of states if in the U.S., Canada or Mexico, if not, the state is input manually. Following this, the city will be entered 170. All this will be done by selecting the appropriate options appearing on the touch screen 148 to select the names of the country, state, and city if the same is not offered as an option by the program, otherwise they will be keyed in. Thereafter, an inquiry is made 172 whether the city, state and country match one another, and, if the FINALIST program finds a correlation, the program continues. If there is no such correlation, the program comes to an end 192.

Assuming that there is a correlation among the country, state and city, the user is then directed to enter the name of the addressee 174 and then enter the zip code 176. If the address is a U.S. Address, this will be accomplished automatically by the program. An inquiry is made whether the zip code is correct 178. Once more, this is accomplished by the program where a determination is made whether an entered zip code is correct. If it is not, the program will attempt to correct the zip code 179 and an inquiry is made whether this attempt has resulted in a correct zip code 180. If it is corrected, there is a return and the zip code is entered. If it is not correct, the program is ended 192. Assuming that the zip code is proper, the name of the addressee is entered 182 and the postcard is printed 184 by the printer 38. Thereafter, the post card is dispensed 186.

With reference now to FIG. 2, the postcard 76 that is printed will be part of a web 42 that is trained about the reel 40. The postcard forms 42 disposed upon the reel 140 will experience different curvatures depending upon their location on the reel. More specifically, those postcard forms 42 located on the outer portion of the reel 40 will have less curvature than those located near the center of the reel. It clearly would be advantageous to supply a linear postcard to the user. In order to do so, measures are taken so that the difference in curvature of the postcards is taken into account. The postcard delivery unit 28 has a mechanism for taking into account variations in curvatures of the postcard forms and providing a linear postcard to the chute 26. This is accomplished by the printer 38 delivering a cut, finished postcard upon the deck 100 which will probably have a curl. By finished is meant the address and required bar codes have been printed and the postcard cut from the web. It will be noted that the guide 98 has a lip 93 thereon so as to assure engagement with the end of a postcard even though the same is curled. The curled postcard will be extended between the guide 96 and the roller 50 toward the belt 72. Thereafter, the postcard will be conveyed between the two belts 64, 72. It will be noted that the belt 64 is initially at an angle relative to the belt 72 to again accommodate for a curvature in a postcard. As the postcard is conveyed by the belts 64, 72, it will be subject to severe bending as it turns about the roller 54. This will put an exaggerated curl on the postcard 76, so that regardless of the original curvature, the curl will be the same after turning about the roller 54. Thereafter, the postcard 76 is sent over the guide 74 between the belt 72 and roller 68. The postcard 76 will be conveyed across the roller 68 which has a relatively large diameter with the resulting affect that the postcard will assume a linear orientation by the time it is conveyed again between the belts 64 and 72, at the location of the pulley **62*d* and 70*c*. As the postcard exits from the belts 64, 72 into the chute 26**, it will have been straightened out as a result of the bending as described previously.

Returning to FIG. 6, after the postcard is dispensed 186, an inquiry is made 188 whether the user wishes to have a ticket dispensed 188. Such inquiry will be displayed on the touch screen 20. If not, the program comes to an end, but if the user wishes to have a ticket dispensed, user will indicate so through appropriate pressing of a location on the touch screen 20. After the ticket is dispensed, the program comes to an end. The ticket dispensing can be associated with the environment in which the finishing kiosk is found. As for example, in the National Postal Museum in Washington, D.C., which is part of the Smithsonian Institute, one would be able to send a postcard to an addressee and receive a ticket that would allow the user to participate in activities at the postal museum. On the other hand, if one simply wished to send a postcard without a ticket, one is able to do so. Although a coin receiver and changer is not shown in the finishing kiosk 10 of the instant invention, one can be provided in such a kiosk as such devices are well known and do not necessarily form a part of the instant invention. With such charging for a post card, a receipt can be dispensed instead of a ticket.

Thus, what is shown and described is a postal finishing kiosk where a user, who is usually a tourist, is able to obtain a postcard with the name and address of the recipient thereon, as well as codes that would be helpful to a subsequent postage applying kiosk such as that shown and described in concurrently filed patent application entitled "Postage Applying Kiosk" U.S. Pat. No. 5,369,258.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A mail piece finishing kiosk comprising:

a computer that is programmed with an address data base;

input means in communication with said computer for entering an address to which a finished mail piece is to be sent;

a printer in communication with said processor having a source of preprinted mail pieces; whereas said processor having means for comparing the address entered through said input means with addresses in the address data base and said printer having means for printing a bar code representing the country category to which the mail piece is addressed, and means for printing orientation codes on the piece;

means for printing addresses on the mail piece in response to commands from said computer; and means adjacent to said printer for receiving a mail piece by said printer and removing any curl in the mail piece.

2. The mail piece finishing kiosk of claim 1 wherein said input means is a touch screen.

3. The mail piece finishing kiosk of claim 1 further including means in communication with said computer for broadcasting prompts.

4. The mail piece finishing kiosk of claim 1 further including means in communication with said computer for giving visual-audio prompts.

5. The mail piece finishing kiosk of claim 1 further including said printer having a web of mail price forms having pre-printed orientation codes thereon.

6. The mail piece finishing kiosk of claim 1 further including a second printer in communication with said computer, said second printer having a source of tickets.

7. A method of finishing a mail piece comprising:

a) supplying a mail piece web having a plurality of mail piece forms;

b) inputting address data into a printer;

c) printing address data on a mail piece form portion of the mail piece web in response to the input;

d) printing a bar code on the mail piece form portion of the mail piece web indicating the country category to which the mail piece is to be sent, wherein said step of providing mail piece forms includes the step of providing mail piece forms with codes to indicate mail piece orientation, e) cutting a mail piece form from the mail piece web to form a mail piece; and f) removing a curl in the mail piece.

8. The method of claim 7 including the step of further supplying a ticket in addition to the mail piece.

9. The method of claim 7 further including the step of providing audio prompts to assist in the inputting of data in step b.

10. The method of claim 7 further including the step of providing visual, audio prompts to assist in the inputting of data in step b.

11. The method of claim 7 further including comparing input address data against a mail data list to assure that the input address data is correct.

* * * * *